J. PETTENGILL.
MACHINE FOR DIGGING POTATOES.

No. 36,669. Patented Oct. 14, 1862.

Witnesses:

Inventor:

UNITED STATES PATENT OFFICE.

JOHN PETTENGILL, OF CARROLL, NEW HAMPSHIRE.

IMPROVEMENT IN MACHINES FOR DIGGING POTATOES.

Specification forming part of Letters Patent No. 36,669, dated October 14, 1862.

*To all whom it may concern:*

Be it known that I, JOHN PETTENGILL, a citizen of the United States of America, and a resident of Carroll, in the county of Coos and State of New Hampshire, have made a new and useful invention having reference to the Digging or Removal of Potatoes from Land; and I do hereby declare the same to be fully described in the following specification and represented in the accompanying drawings, of which—

Figure 1:
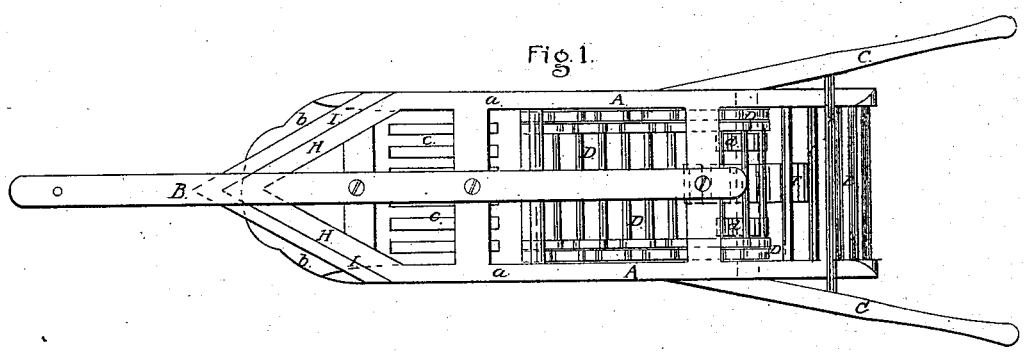
Figure 2:
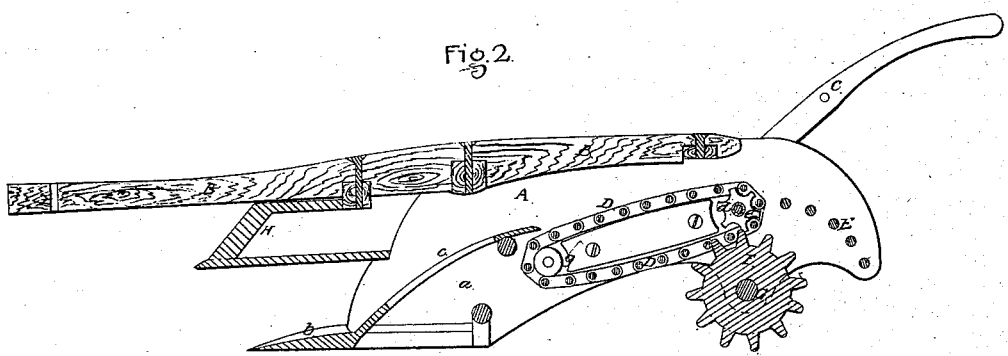
Figure 3:
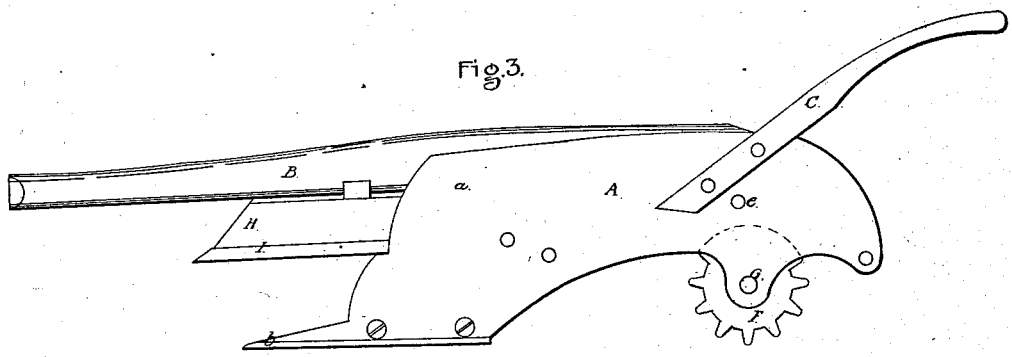

Figure 1 is a top view, Fig. 2 a longitudinal section, and Fig. 3 a side elevation, of it.

My machine may be used not only for digging potatoes, but to pulverize or cultivate the soil.

In the drawings, A denotes the frame of such machine, it being provided with a tongue, B, and a pair of handles, C C, they being disposed as exhibited in such drawings. The actuating power, whether such be a horse or oxen, is to be connected to the tongue, while the person who directs the movements of the machine is to take hold of the handles. The frame is open between its two vertical sides *a a*, and is provided at its front with a sharp or flat nose or beak, *b*, which is to enter the soil and penetrate below the potatoes. Directly in rear of the said nose *b*, and between the two sides *a a*, is an inclined grate or grid, *c*, which leads toward a rotary endless grid, D, consisting of rods laid parallel to each other and connected at their extremity by joint-links. This endless grid works around two sprocket-wheels, *d d*, fixed upon a transverse shaft, *e*. It also traverses about rollers whose journals project from the inner surfaces of the sides *a a*, one of such rollers being seen at *g* in Fig. 2. Furthermore, there is a curved stationary grid, E, arranged in rear of the endless grid, it being composed of a series of rods extending across the frame A from side to side thereof.

A toothed wheel, F, engages with the endless grid, and is arranged below it, as shown in Figs. 2 and 3, the said wheel being fixed on a horizontal shaft, G. While the machine may be in operation this wheel rests on the ground, and as the machine may be drawn along over the same the wheel will be put in revolution, and will actuate or set in motion the endless grid.

Underneath the tongue B, and over the horizontal nose or beak *b*, an angular rim or deflector, H, is arranged, as shown in the drawings, the lower edge of which is furnished with two cutters or cutting devices, I I, which are disposed at an acute angle to one another, so that when the machine may be in operation they may pass through the vines and sever them from the tubers or potatoes, the deflector subsequently operating to force such vines laterally out of the soil or out of the path of movement of the machine.

The rearmost grid, E, although advantageous in its connection with the endless grid, is not absolutely essential to the machine, and may often be dispensed with.

In the operation of this machine the potatoes and soil, while it may be drawn along, will be forced up the front grid and upon the rotary or movable grid, and by such will be separated, the soil being broken up and discharged from the potatoes and caused to fall between the bars of the grid, while the potatoes may remain thereon, and will be finally carried backward and discharged off the rear end of the endless grid.

I claim as my invention—

The horizontal beak or nose *b*, an inclined plane or grid, *c*, the endless grid D, and the wheel F on the same, the deflector H, and knives I I, arranged and combined together substantially in manner and so as to operate as and for the purpose specified.

JOHN PETTENGILL.

Witnesses:
R. H. EDDY,
F. P. HALE, Jr.